Patented Oct. 22, 1929

1,732,503

UNITED STATES PATENT OFFICE

KARL DACHLAUER AND CHRISTOPH THOMSEN, OF HOCHST-ON-THE-MAIN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

WATER-SOLUBLE CONDENSATION PRODUCT AND PROCESS OF MAKING SAME

No Drawing. Application filed March 5, 1926, Serial No. 92,583, and in Germany March 9, 1925.

The object of our present invention is the preparation of water-soluble condensation products from halogenated organic carbonyl-containing compounds and aromatic hydroxy compounds.

We have found that the said condensation products from halogenated organic compounds containing carbonyl and aromatic hydroxy compounds, which are insoluble in water, can be transformed into water-soluble products which possess excellent froth-forming and emulsifying properties and are capable of transforming animal hides into leather of excellent quality. Moreover, by means of the said products it is possible to produce on the animal fibre efficient resists against dyestuffs.

The most suitable compounds containing a carbonyl for carrying out our invention are simple or mixed halogenated ketones or aldehydes and they may be used either alone or in mixture. The derivatives of the said compounds, of course, also fall within the scope of our invention.

Instead of the halogenated ketones or aldehydes there may also be used as parent materials such halogenated compounds which react like halogenated ketones or aldehydes in that they split off halogen alkyls when condensed with aromatic hydroxy compounds. An example of such a compound is asymmetric dichlorether which reacts with phenol as follows:

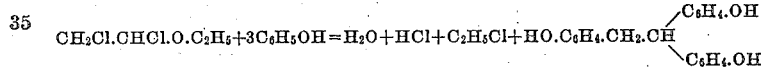

The transformation of these condensation products into water-soluble products may be carried out by any of the known methods, for instance by sulfonation. As sulfonating agent may be employed among others, concentrated sulfuric acid or chlorosulfonic acid. Some of the products are colored and can be clarified or decolorized by a suitable treatment, for instance by means of a reducing agent.

Instead of the halogen derivatives alone, there may also be used mixtures of aldehydes, ketones or ethers with their halogen derivatives as they arise for instance during their preparation.

The following examples serve to illustrate our invention:

1. Into 12.3 kg. of phenol are slowly introduced at 100° C., while stirring, 4 kg. of chloracetone and 8 kg. of concentrated hydrochloric acid. After the condensation is complete, the hydrochloric acid is eliminated by washing and the product is then sulfonated at about 95° C. with 10 kg. of sulfuric acid of 96% strength, while stirring.

The phenol may be replaced by tricresol or crude coal-tar phenol. Any uncondensed portions may be separated by steam distillation prior to the sulfonation.

2. Into 11.3 kg. of phenol are slowly introduced at 100° C., while stirring, 3.1 kg. of chloroacetaldehyde and 6 kg. of conc. hydrochloric acid. After the condensation is complete and the hydrochloric acid has been eliminated by washing, the product is sulfonated with 8 kg. of concentrated sulfuric acid at about 95° C.

The phenol may also in this case be replaced by tricresol or crude coal-tar phenol and the chloracetaldehyde for instance by dichlorether.

3. Into 10 kg. of phenol are run at 100° C. 5.1 kg. of asymmetrical dichlorether and this mixture is heated, while stirring, until the evolution of hydrochloric acid and ethyl chloride has ceased. The condensation product is sulfonated while hot with 7.8 kg. of concentrated sulfuric acid.

4. Into 14.1 kg. of phenol are introduced at 100° C., while stirring, 4.6 kg. of chloracetone and 8.9 kg. of conc. hydrochloric acid. When the condensation is complete and the hydrochloric acid has been eliminated by washing, the condensation product is heated for some hours on the water-bath together with 14.9 kg. of crystallized sodium sulfite, 29.7 kg. of water and 4.42 kg. of formaldehyde of 40% strength until the whole has entirely dissolved.

5. Into 33.8 kg. of phenol are slowly run at 95-100° C., while stirring, 10.7 kg. of chlorethylmethylketone together with about 30 kg. of concentrated hydrochloric acid and this mixture is stirred at the same temperature until the reaction is complete. After the condensation product has been separated from the aqueous hydrochloric acid and washed with water, it is treated with 20 kg. of concentrated sulfuric acid at about 95° C., while stirring, until it becomes soluble in water.

The new products of the present invention may be represented by the following general formula:

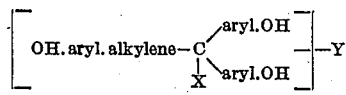

wherein X represents hydrogen or an alkyl radical, the hydrogen atoms of which may be further substituted, and Y represents one of the groups $-SO_3H$ or $-alkyl.SO_3H$.

We claim:

1. As new products, the compounds of the following formula:

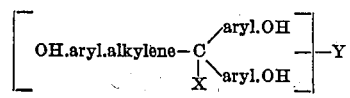

wherein X represents hydrogen or an alkyl radical, the hydrogen atoms of which may be further substituted, and Y represents one of the groups $-SO_3H$ or $-alkyl.SO_3H$.

2. As new products, the compounds of the following formula:

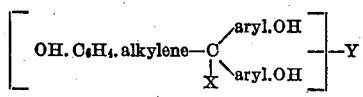

wherein X represents hydrogen or an alkyl radical, the hydrogen atoms of which may be further substituted, and Y represents one of the groups $-SO_3H$ or $-alkyl.SO_3H$.

3. As new products, the compounds of the following formula:

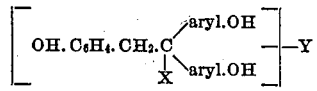

wherein X represents hydrogen or an alkyl radical, the hydrogen atoms of which may be further substituted, and Y represents one of the groups $-SO_3H$ or $-alkyl.SO_3H$.

4. As a new product, a compound of the following formula:

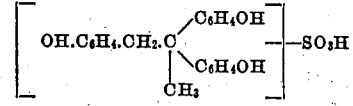

In testimony whereof, we affix our signatures.

Dr. KARL DACHLAUER.
Dr. CHRISTOPH THOMSEN.